S. A. BOND.
CULTIVATOR.
APPLICATION FILED AUG. 3, 1908.

951,720.

Patented Mar. 8, 1910.

Witnesses
F. L. Ourand
M. K. Freeman

Inventor
Sidney A. Bond
By Louis Bagger & Co.
his Attorneys

UNITED STATES PATENT OFFICE.

SIDNEY A. BOND, OF DANIELSVILLE, GEORGIA.

CULTIVATOR.

951,720.  Specification of Letters Patent.  Patented Mar. 8, 1910.

Application filed August 3, 1908. Serial No. 446,743.

*To all whom it may concern:*

Be it known that I, SIDNEY A. BOND, a citizen of the United States, residing at Danielsville, in the county of Madison and State of Georgia, have invented certain new and useful Improvements in Cultivators, of which the following is a specification.

My invention relates to an improvement in cultivators, and the object is to provide means whereby the harrow or cultivator teeth can be arranged so that the soil will be thoroughly broken up.

A further object is in the provision for making the cultivator into a straddle row harrow.

The invention consists of certain novel features of construction and combinations of parts which will be hereinafter described and pointed out in the claim.

Figure 1:
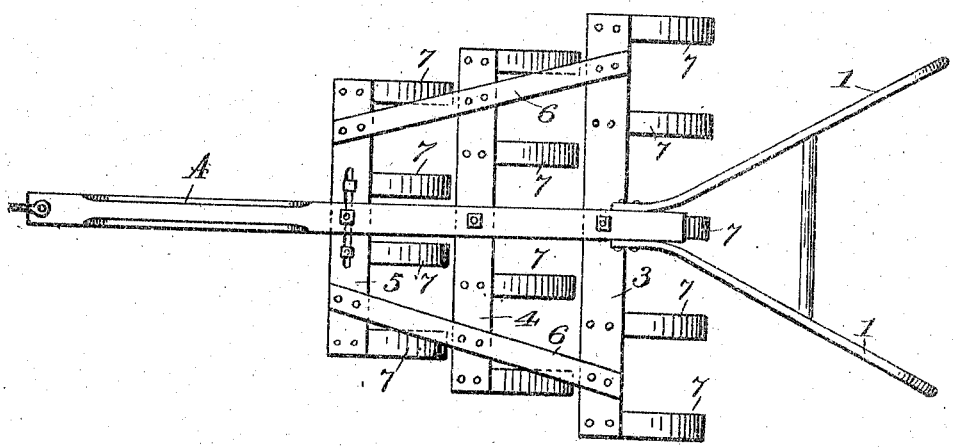
Figure 2:
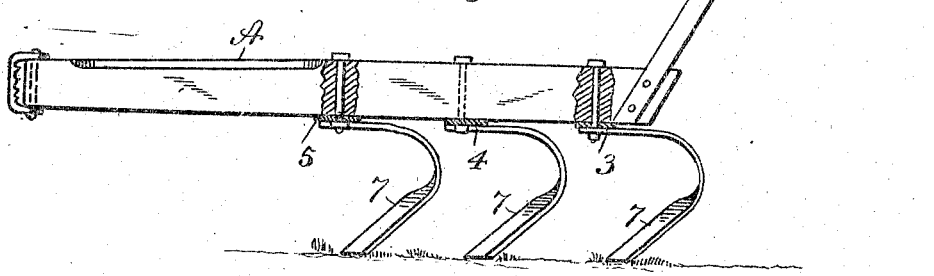

In the accompanying drawings:—Figure 1 is a top plan view; and Fig. 2 is a longitudinal sectional view.

A represents the beam and 1, 1 are the handles which are connected thereto. Secured to the beam and extending transversely thereto in rows are bars 3, 4 and 5, the bar 3 being of greater length than the bar 4 and the bar 4 of greater length than the bar 5. Connecting the outer ends of the bars are plates 6, 6.

Secured to the bars by bolts are teeth 7, 7. The two central or middle teeth on the bar 5 are capable of being adjusted horizontally along the bar 5. All of the teeth are arranged in a staggered formation, that is, the teeth on the bar 4 are received in the space between the teeth on the bar 5, and the teeth on the bar 3 are received in the space between the teeth on the bar 4, so that the soil is thoroughly broken up and loosened around the roots of the crops. The central tooth on the bar 3 is capable of being removed, and if necessary the central teeth on the bar 3 are capable of being adjusted to form a straddle harrow so that the harrow can work on both sides of the row. The adjustment of the two central teeth on the bar 5 is made in case the ordinary position of the teeth is insufficient to accommodate the row between the teeth, and in this instance the teeth are set over upon the bar to permit of the row being received between the teeth.

From the foregoing it will be seen that I have provided a cultivator which can be used for the ordinary cultivation of the soil or be used for a straddle harrow. Again the general arrangement of the teeth upon the bars permits of the soil being thoroughly broken up so that the crops receive the benefit of the soil being broken up around the roots.

It is evident that more or less slight changes might be resorted to in the form and arrangement of the several parts described without departing from the spirit and scope of my invention, and hence I do not wish to be limited to the exact construction herein set forth, but:

Having fully described my invention, what I claim as new and desire to secure by Letters Patent, is:—

In a harrow and cultivator, the combination with a beam, handles connected to the beam, of bars of different lengths mounted upon the beam, the rear bar being of the greatest length, plates connecting the ends of the bars, a detachable tooth connected centrally of the rear bar, teeth on the rear bar on both sides of the central tooth, teeth connected to the other bars between the line of the teeth on the rear bar, and a slot formed on the forward bar whereby the teeth on the forward bar may be adjusted.

In testimony whereof I affix my signature, in the presence of two witnesses.

SIDNEY A. BOND.

Witnesses:
J. F. L. BOND,
A. H. LONG.